(12) United States Patent
Yuki

(10) Patent No.: US 10,621,311 B2
(45) Date of Patent: Apr. 14, 2020

(54) INFORMATION PROCESSING APPARATUS, METHOD, AND STORAGE MEDIUM

(71) Applicant: CANON KABUSHIKI KAISHA, Tokyo (JP)

(72) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 15/188,380

(22) Filed: Jun. 21, 2016

(65) Prior Publication Data
US 2016/0378959 A1 Dec. 29, 2016

(30) Foreign Application Priority Data
Jun. 26, 2015 (JP) .................. 2015-128691

(51) Int. Cl.
*G06F 21/10* (2013.01)
*G06F 21/12* (2013.01)
*G06F 3/048* (2013.01)
*G06F 21/62* (2013.01)

(52) U.S. Cl.
CPC ............ *G06F 21/105* (2013.01); *G06F 3/048* (2013.01); *G06F 21/121* (2013.01); *G06F 21/6272* (2013.01)

(58) Field of Classification Search
CPC ...... G06F 21/105; G06F 21/121; G06F 3/048; G06F 21/6272
See application file for complete search history.

(56) References Cited

U.S. PATENT DOCUMENTS

| | | | | |
|---|---|---|---|---|
| 6,006,035 | A | * | 12/1999 | Nabahi ............... G06F 8/61 709/221 |
| 7,900,246 | B1 | * | 3/2011 | Xu ................ G06F 21/121 726/9 |
| 2004/0088176 | A1 | * | 5/2004 | Rajamani ........... G06F 21/10 717/177 |
| 2004/0249762 | A1 | * | 12/2004 | Garibay .............. G06F 21/10 705/59 |

FOREIGN PATENT DOCUMENTS

| | | | | |
|---|---|---|---|---|
| CN | 101674582 A | 3/2010 | | |
| JP | 2011-008659 A | 1/2011 | | |
| JP | 5701151 B2 | 4/2015 | | |
| JP | 2012247925 A | * | 4/2015 | ........... G06F 21/22 |
| KR | 10-0957269 B1 | 5/2010 | | |

* cited by examiner

*Primary Examiner* — Paul E Callahan
(74) *Attorney, Agent, or Firm* — Canon U.S.A, Inc., IP Division

(57) ABSTRACT

When a license file holds license type information and the license type is "monthly", a license management system can update expiration timing of the license even if the license is already used.

9 Claims, 12 Drawing Sheets

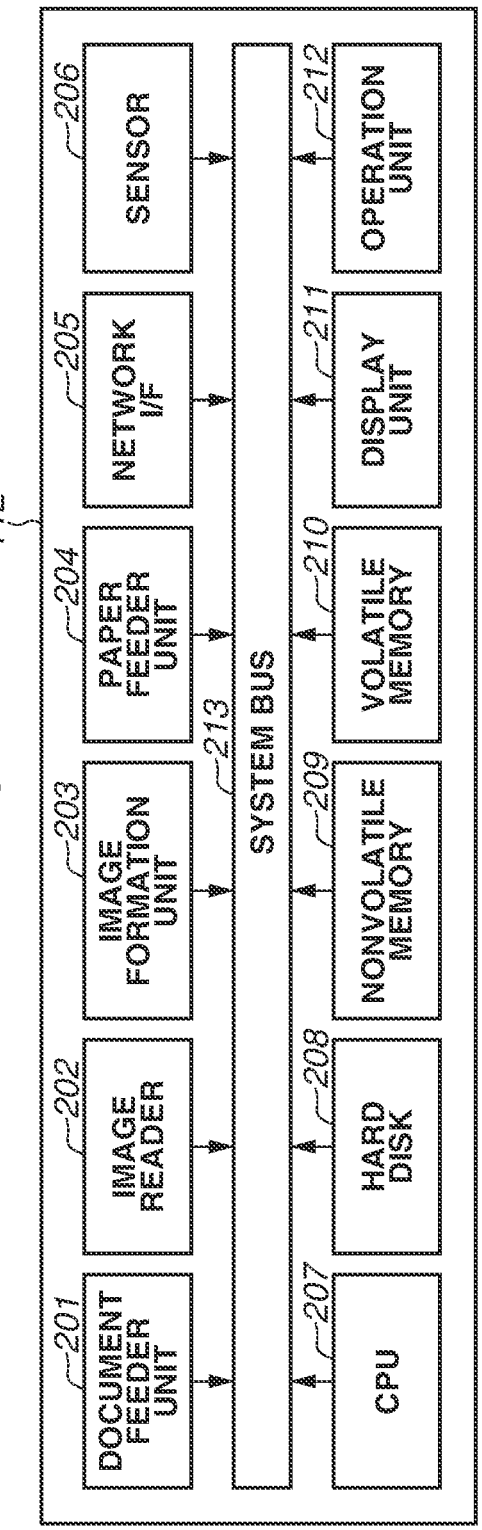
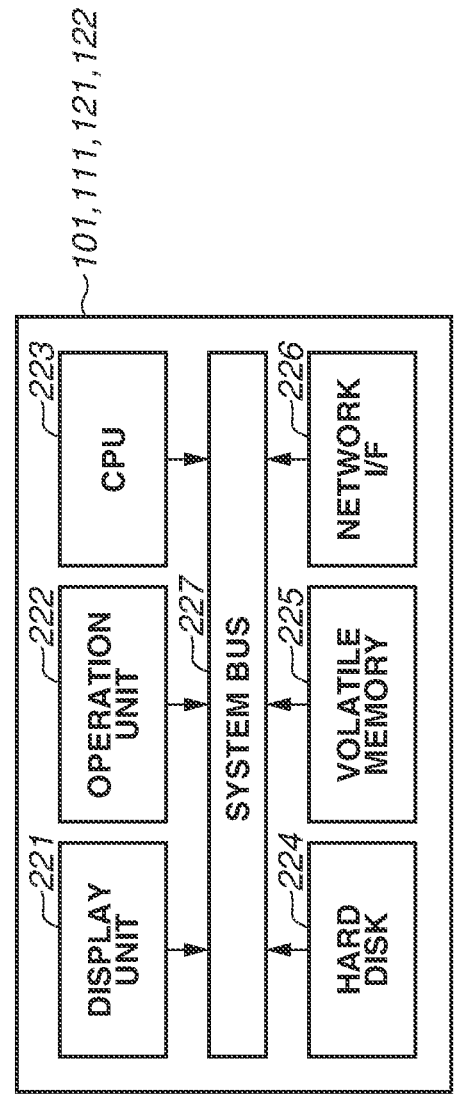

FIG. 4A

APPLICATION INFORMATION — 401

| APPLICATION ID — 402 | APPLICATION NAME — 403 | APPLICATION VERSION — 404 | LICENSE TYPE — 405 | STATUS — 406 | USAGE STARTABLE DATE — 407 | USAGE END DATE — 408 | OPERATION — 409 |
|---|---|---|---|---|---|---|---|
| app001 | LIPS | 3.0 | PACKAGE | START | | | TRANSFER OF LICENSE — 410 |
| app002 | SEITON FAX | 2.1 | MONTHLY | START | 2015/2/1 | 2015/5/31 | |
| app003 | VNC | 1.3 | TRIAL | START | | 2015/5/20 | INVALIDATION OF LICENSE — 411 |

FIG. 4B

INSTALLATION SCREEN — 421

INPUT LICENSE ACCESS NUMBER AND THEN CLICK INSTALLATION BUTTON.

LICENSE ACCESS NUMBER [ 422 ]

[ INSTALL ] — 423

FIG.5A — APPLICATION FILE 501
- APPLICATION ID 502
- APPLICATION NAME 503
- APPLICATION VERSION 504
- EXECUTION FILE 505

FIG.5B — LICENSE FILE (MONTHLY) 511
- LICENSE ID 512
- LICENSE TYPE: MONTHLY 513
- APPLICATION ID 514
- DEVICE SERIAL NUMBER 515
- USAGE START YEAR/MONTH/DAY 516
- USAGE END YEAR/MONTH/DAY 517

FIG.5C — LICENSE FILE (TRIAL) 511
- LICENSE ID 512
- LICENSE TYPE: TRIAL 513
- APPLICATION ID 514
- DEVICE SERIAL NUMBER 515
- NUMBER OF DAYS OF USE LEFT 518

FIG.5D — LICENSE FILE (PACKAGE) 511
- LICENSE ID 512
- LICENSE TYPE: PACKAGE 513
- APPLICATION ID 514
- DEVICE SERIAL NUMBER 515

FIG.5E — TRANSFER LICENSE FILE 521
- APPLICATION ID 522
- TRANSFER SOURCE DEVICE SERIAL NUMBER 523

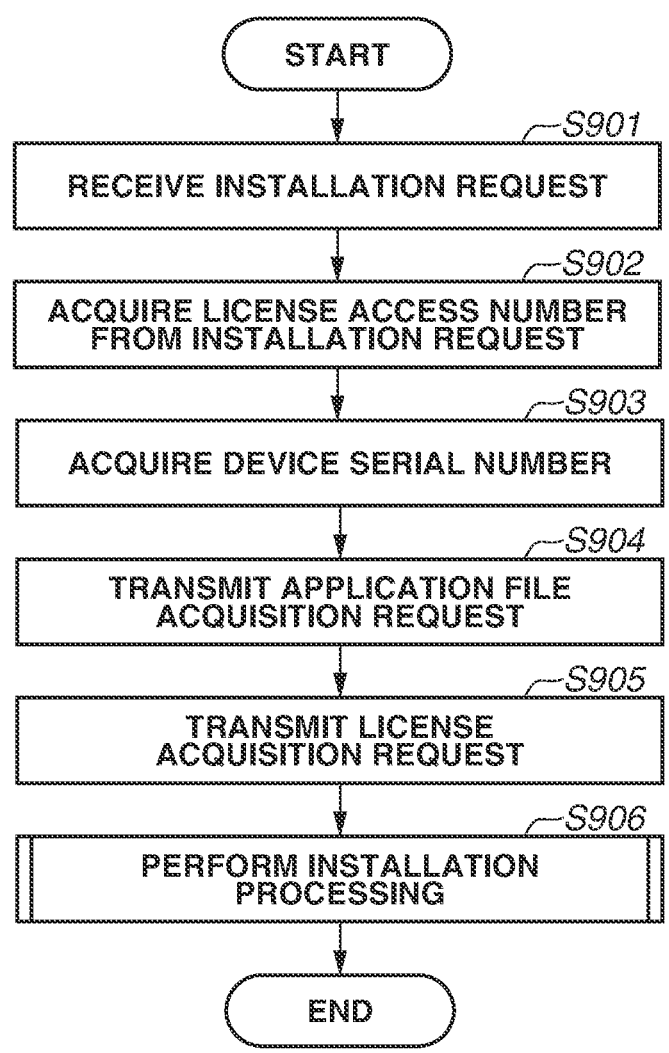

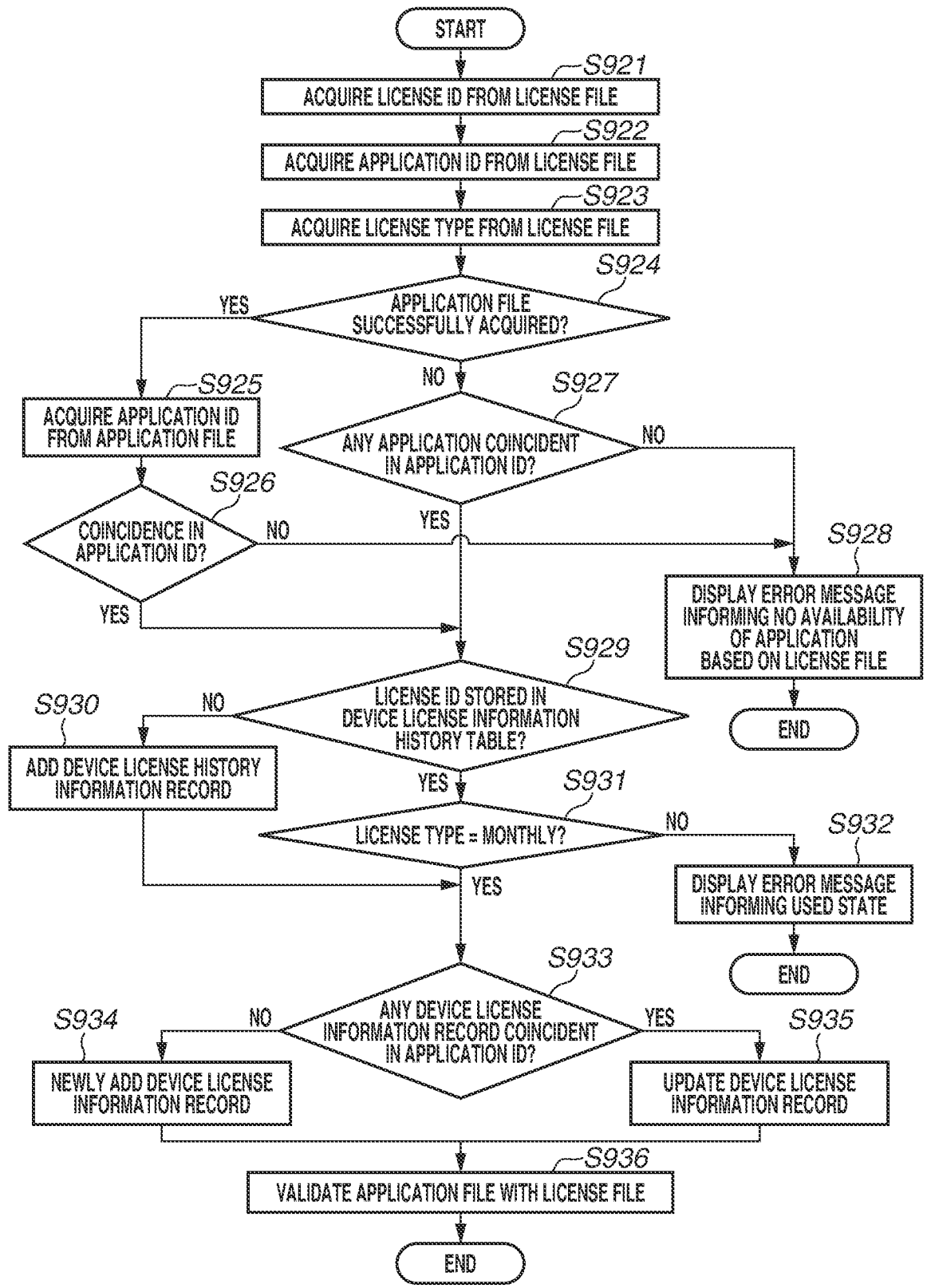

INFORMATION PROCESSING APPARATUS, METHOD, AND STORAGE MEDIUM

BACKGROUND OF THE INVENTION

Field of the Invention

The present invention relates to an information processing apparatus and a related method capable of controlling an operation of an application based on a license file, and a storage medium.

Description of the Related Art

There is an information processing apparatus on which a licensed application can be installed via a network. When such an application is installed, a history of the license is recorded in a plurality of nonvolatile areas, such as Ferroelectric Random Access Memory (FRAM)® and a hard disk drive/flash memory. Managing the license history with a plurality of nonvolatile memories is useful in that, even if the license history is deleted from one nonvolatile area, the license history can be read from the other nonvolatile area and can be copied to the former nonvolatile area for restoration of the license history. For example, even in a case where a hard disk drive is damaged and replaced with a new hard disk drive, the license history can be restored by moving the stored history data from the FRAM® to the new hard disk drive. Thus, a license management control that can prevent extension of the number of days of use by reusing a license which should be usable only for a predetermined number of days can be realized. An apparatus having such a backup mechanism is discussed in Japanese Patent No. 05701151.

SUMMARY OF THE INVENTION

An information processing apparatus according to an exemplary embodiment of the present invention can control an operation of an application based on a license file. The information processing apparatus includes a holding unit configured to hold license identification information that uniquely identifies an installed license file in a history table, and a control unit configured to receive an instruction to install a license file and prevent the license file from being installed again if the license identification information that uniquely identifies the installation instructed license file is present in the history table. When the installation of the license file is instructed, the control unit performs a control in such a way as to install the license file, if it is confirmed that the installation instructed license file is a specific type license file, even if the license identification information that uniquely identifies the installation instructed license file is present in the history table.

Further features of the present invention will become apparent from the following description of exemplary embodiments with reference to the attached drawings.

BRIEF DESCRIPTION OF THE DRAWINGS

FIGS. 2A and 2B illustrate hardware configurations.
FIGS. 4A and 4B illustrate exemplary screens that can be provided by an image forming apparatus.
FIGS. 5A to 5E illustrate data structures of various files.
FIGS. 9A and 9B are flowcharts illustrating processing that can be performed by an installation request receiving unit.

DESCRIPTION OF THE EMBODIMENTS

Figure 1:
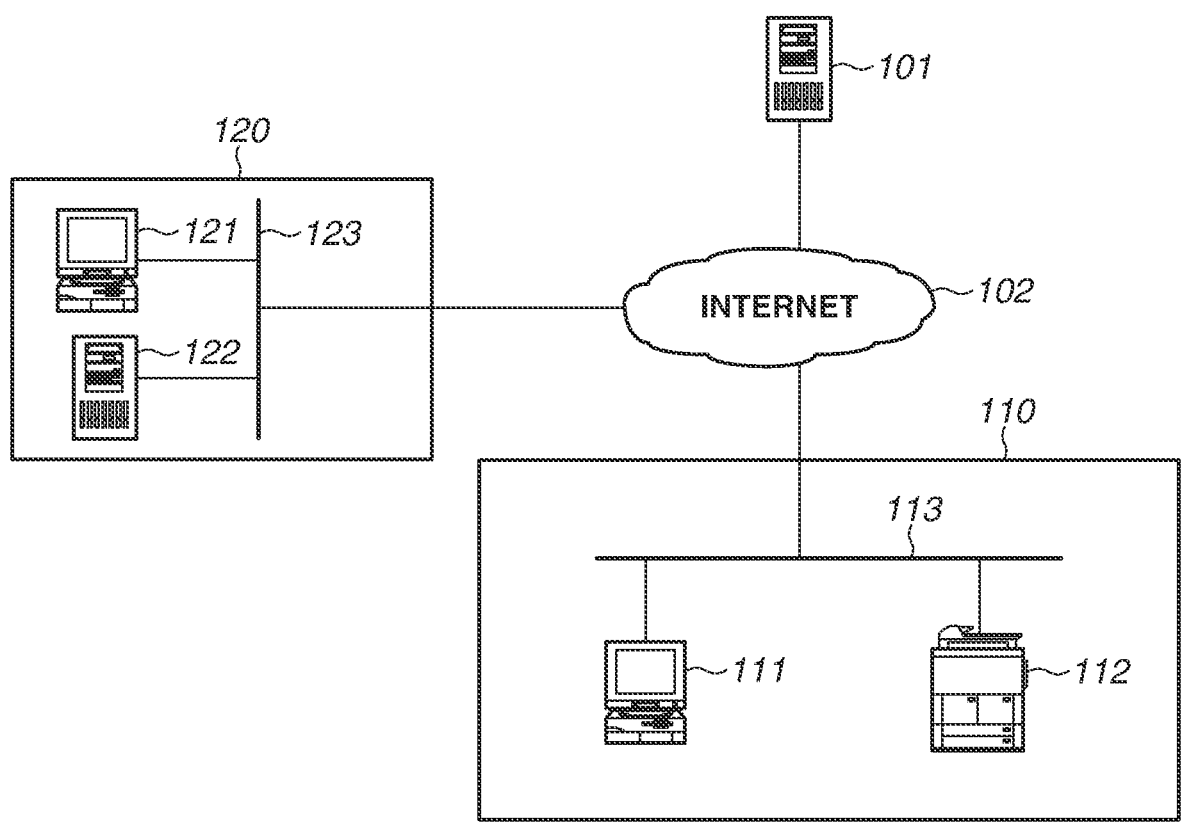
FIG. 1 illustrates a network configuration.

According to the technique discussed in Japanese Patent No. 05701151, the license history is stored in both the hard disk and the FRAM®. However, compared to the hard disk, the FRAM® is expensive and is insufficient in capacity. Therefore, the number of license histories that can be stored in the FRAM® may be limited. Therefore, it is predicted that an older license history is deleted so that a new license history can be stored securely when the number of license histories reaches the upper limit.

On the other hand, it is assumed that issuance of a license for an application is performed only one time, as discussed in the patent literature 1. However, if the business is based on monthly billing, the issuance of the license is repetitively performed each time a user updates the usage contract of an application.

According to the above-mentioned business style, unlawful use of an application may occur because a license used in the past will be installed again on the information processing apparatus when an older license history stored in the FRAM (registered trademark) disappears.

To solve the above-mentioned problem, the present invention intends to cause an information processing apparatus equipped with a memory having a limited storage capacity to hold many license histories by causing the information processing apparatus to install a license that does not update identification information while updating the valid period of the license.

Hereinafter, a first exemplary embodiment of the present invention will be described in detail below with reference to attached drawings.

The following are definitions of technical terminologies used herein.

"Application file" is a program file required to expand a basic function of an image forming apparatus. The application file can be stored beforehand in a hard disk of the image forming apparatus or can be installed later as an external file in the hard disk of the image forming apparatus. As described in detail blow, a license file is required to expand the basic function by using the application file stored in the hard disk.

"Application information" is information about an application file held by a license server 101. The license server 101 holds, as application information, application ID (i.e., identifier) that uniquely identifies each application.

"Commodity information" is information necessary to use each application when it is sold in the market. The license server 101 according to the present exemplary embodiment holds an information group constituted by the following commodity information.

The first commodity information is "commodity ID", which is an identifier that can uniquely identify each commodity. The second commodity information is "number of rights", which is a numerical value indicating the usability of the application when a commodity having the above-mentioned commodity information has been purchased. The third commodity information is "commodity type", which is type information representing a sales format of the commodity. In the present exemplary embodiment, "package", "monthly", and "trial" are examples of the commodity type, although the commodity type is not limited to only three types. The fourth commodity information is "application ID" which is identification information that can uniquely identify each application that can be used when the commodity is purchased.

In a case where the commodity type of a purchased commodity is "monthly", it is feasible to register "contract start" and "contract end" in the license server 101. If the contract of an application for a target image forming apparatus 112 starts, the application is usable without any fee during the first month and is usable with payment of a predetermined fee from the next month. Further, the target image forming apparatus can use the application unless the contract is suspended. To realize the above-mentioned function, the license server 101 holds the following additional commodity information if the commodity type of the commodity is "monthly."

The first additional commodity information is "contract period", which designates application usage period when the contract starts upon purchase of a commodity. If the contract period is one month and the contract starts from Apr. 5, 2015, the application is usable until the end of May 2015 (without any fee in April). If the contract is not suspended, the application is continuously usable until the end of June 2015. The second additional commodity information is "license suspension date", which designates specific day of the last month of the contract on which the license is suspended. If the last month of the contract is May 2015 and the license suspension date is the end of the month, the application cannot be used after May 31, 2015. The third additional commodity information is "contract suspension acceptance date", which designates specific day of the last month of the contract until which the contract suspension is acceptable. If the contract suspension acceptance date is the 20th day and the requested contract suspension date is May 31, 2015, it is required to accept the contract suspension before Apr. 20, 2015.

In a case where the commodity type of a purchased commodity is "trial", the license server 101 holds commodity information about the number of days of use, which designates the number of days left to use the application based on the license.

"License access number" is a character string expressed by using alphabetic characters, which is required to issue a license for an application.

"Device serial number" is an identifier that can uniquely identify the image forming apparatus 112.

The license file, which is required when the image forming apparatus 112 uses an application, is a file that is used to control an operation of the application. The license file according to the present exemplary embodiment holds the following information.

The first information is "license ID", which is an identifier that can uniquely identify each license file. The license ID is a kind of license identification information. The second information is "application ID", which is application ID of an application that can be used based on the license file. The third information is "device serial number", which is device serial number of the image forming apparatus 112 that can use the license file. The fourth information is "license type", which holds information about the commodity type of a commodity.

If a license file is issued for a purchased commodity having the license type "monthly", the issued license file additionally holds the following information. The first additional information is "contract start year/month/day", which holds information about year/month/day on which the license becomes available. The second additional information is "contract suspension year/month/day", which holds information about year/month/day on which the license is suspended.

If a license file is issued for a purchased commodity having the license type "trial", the issued license file additionally holds information about "number of days of use left" during which the license is usable. It is assumed that a license file is a sellout-type license if the license type is not "monthly." In the present exemplary embodiment, the license file having the license type "trial" or "package" is sellout-type.

FIG. 1 illustrates a network configuration of a license management system according to the present invention.

The license server 101 is a server that can issue a license and can communicate with various apparatuses via an internet 102. A client network environment 110 represents a network environment of a client that has purchased the image forming apparatus 112. The client network environment 110 includes the image forming apparatus 112 and an information processing apparatus 111, which are connected via a local area network (LAN) 113. The LAN 113 is connectable to the internet 102. A sales company network 120 represents a network environment of a sales company that sells an application. The sales company network 120 includes an information processing apparatus 121 and a contract server 122, which are connected via a LAN 123. The LAN 123 is connectable to the internet 102. Although not illustrated in FIG. 1, each of the client network environment 110 and the sales company network 120 can include a plurality of image forming apparatuses or a plurality of information processing apparatuses that are connected to the network.

FIGS. 2A and 2B illustrate hardware configurations of the license management system according to the present invention. FIG. 2A illustrates a hardware configuration of the image forming apparatus 112, which includes the following constituent components. A document feeder unit 201 can automatically feed a document to be read to an image reader (e.g., a scanner) 202 that can read the document. An image formation unit 203 can convert the read document (or received data) into print data and print an image. A paper feeder unit 204 can feed a paper to be used in printing. A network I/F 205, which is connected to the LAN and the internet via a network, can transmit and receive information to and from an external device. A sensor 206 can detect an operational state of each constituent component of the image forming apparatus. A central processing unit (CPU) 207 can control each processing to be performed by the image forming apparatus. A hard disk 208 can store programs and data relating to each processing to be performed by the image forming apparatus. A nonvolatile memory 209, which is a rewritable memory, can hold storage data even in a state no electric power is supplied in the present exemplary embodiment, the nonvolatile memory 209 is the FRAM (registered trademark). A volatile memory 210, which is a rewritable memory, can electrically store temporary data relating to each processing to be performed by the information forming apparatus. A display unit 211 can display information relating to an operational state of the information forming apparatus and information relating to a user operation input via an operation unit 212. The operation unit 212 can accept an instruction input to the information forming apparatus. A system bus 213 can connect the above-mentioned constituent components 201 to 212 so that the data or information can be transmitted to each other.

Each of the license server 101, the contract server 122, and the information processing apparatuses 111 and 121 has a hardware configuration including the following constituent components as illustrated in FIG. 2B. A display unit 221 can display windows, icons, messages, menus, and other user interface information. An operation unit 222 can accept various inputs or instructions from an end user who uses a keyboard or a mouse. A CPU 223 can control each processing to be performed by the apparatus. A hard disk 224 can store programs and data relating to each processing to be performed by the apparatus. A volatile memory 225, which is a rewritable memory, can processing to be performed by the apparatus. A network I/F 226, which is connected to the LAN and the internet via a network, can transmit and receive information to and from an external device. A system bus 227 can connect the above-mentioned constituent components 221 to 226 so that data or information can be transmitted to each other.

Figure 3A:
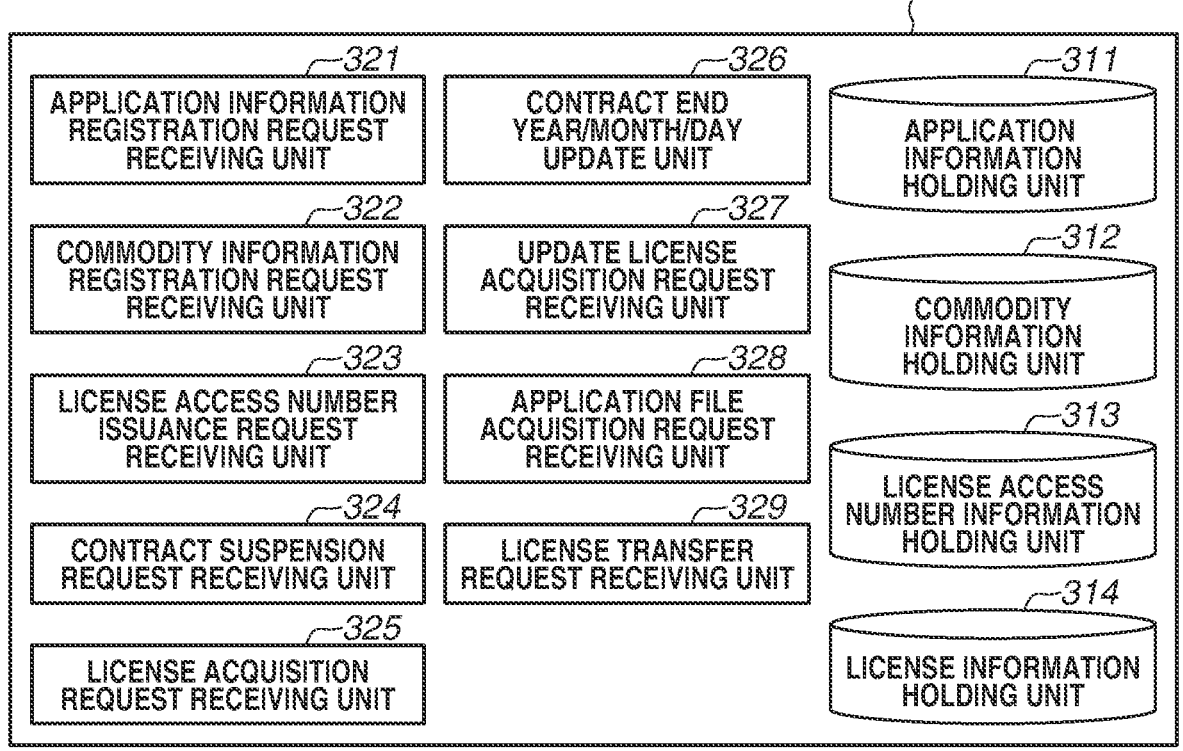
FIGS. 3A and 3B illustrate software configurations.
Figure 3B:
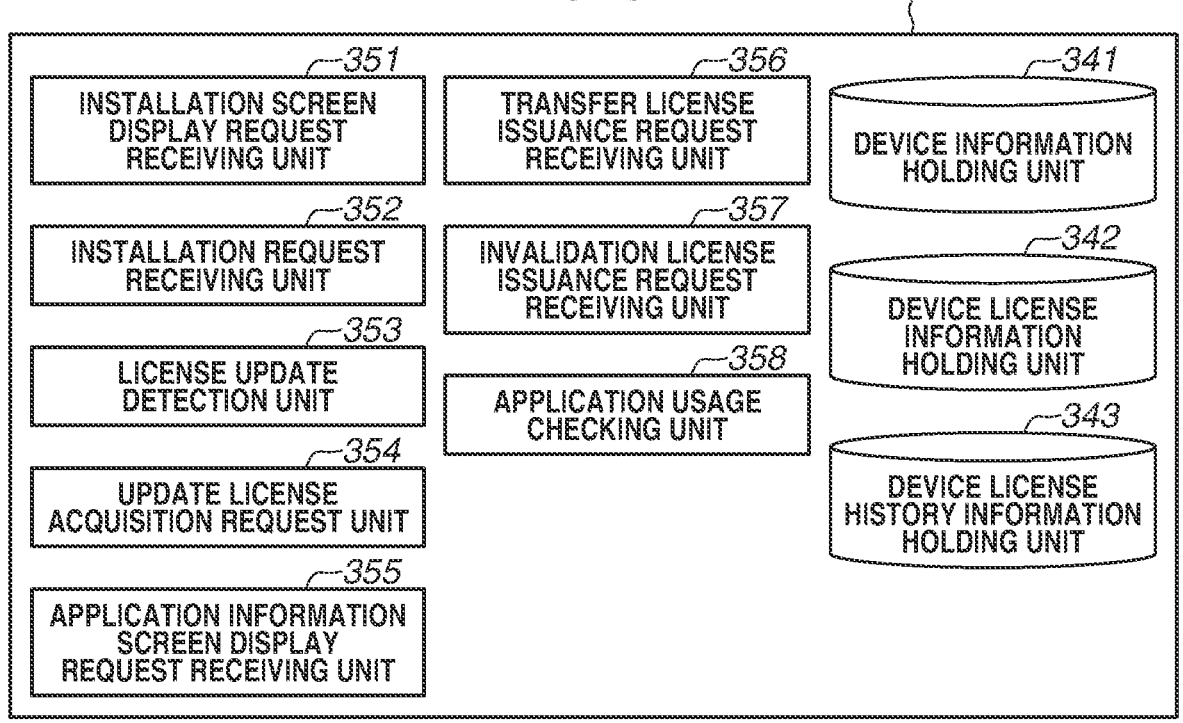

FIGS. 3A and 3B illustrate software configurations of the license management system according to the present invention. FIG. 3A illustrates a software configuration 301 of the license server 101. To realize each unit of the software configuration 301, the CPU 223 of the license server 101 executes a related program loaded from the hard disk 224 of the license server 101 into the volatile memory 225.

An application information bolding unit 311 is a unit configured to hold an application information table in the hard disk 224 of the license server 101. Table A is an example of the application information table stored in the application information holding unit 311.

TABLE A

Application Information Table

| Application ID | Application version | Application name | File path |
|---|---|---|---|
| app001 | 3.0 | LIPS | |
| app002 | 2.1 | SEITON FAX | /apps/seiton 2.1.jar |
| app003 | 1.3 | VNC | /apps/vnc 1.3.jar |

Hereinafter, each column of the application information table will be described in detail below. The "application ID" column is a column that stores information about application ID (i.e., identifier) that uniquely identifies the type of each application. The "application version" column is a column that stores information about version of each application. Each application can be uniquely identified based on the application ID and the application version. The "application name" column is a column that stores information about name of each application. The "file path" column is a column that stores information about path storing each application file. Only when an application file is later installed, as an expansion application, on the image forming apparatus 112, the path of the target application file is stored in the "file path" column. In a case where an application file is already held in the image forming apparatus 112, the "file path" column is vacant. Each record of the application information table is referred to as "application information record", which is registered for each application in the table.

A commodity information holding unit 312 is a unit configured to hold a commodity information table that holds commodity information in the hard disk 224 of the license server 101. Table B is an example of the commodity information table stored in the commodity information holding unit 312.

TABLE B

Commodity Information Table

| Commodity ID | Commodity Name | Commodity Type | Number of Rights | Application ID | Number of Days of Use | Contract Period | License Suspension Date | Contract Suspension Acceptance Date |
|---|---|---|---|---|---|---|---|---|
| P0001 | LIPS | Package | 1 | app001 | | | | |
| P0002 | SEITON FAX monthly type | Monthly | 1 | app002 | | One month | End of month | 20th day |
| P0003 | SEITON FAX package type | Package | 1 | app002 | | | | |
| P0004 | VNC trial | Trial | 1 | app003 | 30 days | | | |
| P0005 | VNC monthly type | Monthly | 1 | app003 | | One month | End of month | 20th day |
| P0006 | VNC package type | Package | 1 | app003 | | | | |
| P0007 | VNC monthly type number of rights 5 | Monthly | 5 | app003 | | One month | End of month | 20th day |

Hereinafter, each column of the commodity information table will be described in detail below. The "commodity ID" column is a column that stores information about commodity ID, which is an identifier that can uniquely identify each commodity. The "commodity name" column is a column that stores information about name of each commodity. The "commodity type" column is a column that stores information about type of each commodity. The commodity type is any one of "package", "monthly", and "trial." The commodity type can be set according to the business style to be realized. The content of an issued license is differentiated according to the commodity type. Although only three commodity types are defined in the present exemplary embodiment, the number of commodity types is not limited to three. The "number of rights" column is a column that stores information about the number of image forming apparatuses that can use the application when the commodity is purchased. The "application ID" column is a column that stores information about application ID of an application that becomes available when the commodity is purchased.

The "number of days of use" column is a column that stores information about number of days during which the application is usable when the commodity type of the commodity is "trial." The "contract period" column, the "license suspension date" column, and the "contract suspension acceptance date" column are columns storing information when the commodity type is "monthly." When the commodity type of a purchased commodity is "monthly", the contract starts when a contract start request is received from a contract suspension request receiving unit 324 described below. The usage period of a license to be issued after starting the contract is determined based on values stored in the "contract period" column and the "license suspension date" column. For example, if the value stored in the "contract period" column is one month, usage period of a license to be issued includes the next month. Further, the value stored in "license suspension date" column is information that designates a specific day of the next month on which the license expires. For example, if the value stored in the "license suspension date" column is the end of the month, the issued license is valid until the end of the next month. Further, in a case where the commodity type is "monthly", the contract can be automatically updated after starting the contract unless the contract is suspended. To suspend the contract, it is necessary to transmit a contract suspension request to the contract suspension request receiving unit 324 during the month the contract is updated. The "contract suspension acceptance date" column is a column that stores information about specific day of the month until which the suspension of the contract is acceptable. Each record stored in the commodity information table is referred to as "commodity information record" and registered for each commodity in the table.

A license access number information holding unit 313 is a unit configured to hold a license access number information table, which holds license access number information, in the hard disk 224 of the license server 101. Table C is an example of the license access number information table stored in the license access number information holding unit 313.

TABLE C license access number information table

| License access number | Commodity ID | Contract Start year/ month/ day | Contract End Year/ Month/ Day | Contract Suspension Acceptance Year/ Month/Day | Contract Update |
|---|---|---|---|---|---|
| LA01 | P0001 | | | | |
| LA02 | P0003 | 2015/2/1 | 2015/5/31 | | FALSE |
| LA03 | P0003 | 2015/4/4 | 2015/5/31 | | FALSE |
| LA04 | P0004 | | | | |
| LA05 | P0007 | 2015/3/10 | 2015/5/31 | | FALSE |

A license information holding unit 314 is a unit configured to hold a license information table, which holds license information, in the hard disk 224 of the license server 101. Table D is an example of the license information table stored in the license information holding unit 314.

TABLE D

License Information Table

| License Access Number | Device Serial Number | License ID |
|---|---|---|
| LA01 | AAA00100 | LF00001 |
| LA02 | AAA00100 | LF00007 |
| LA03 | AAA00130 | LF00004 |
| LA04 | AAA00100 | LF00009 |
| LA05 | AAA00230 | LF00020 |
| LA05 | AAA00200 | LF00027 |

Hereinafter, each column of the license information table will be described in detail below. The "license access number" column is a column that stores information about the license access number used when a license file is issued. The "device serial number" column is a column that stores information about a device number that can be used by the issued license file. The "license ID" column is a column that stores information about license ID, which is an identifier that can uniquely identify each license file.

Each record of the license information table is referred to as "license information record." The license information record is generated for each combination of the license access number and the device serial number designated when the license file is issued. For example, in a case where two device serial numbers "AAA00200" and "AAA00230" are designated for the license access number "LA05", the number of license information records added to the license information table is two. The reason why the device serial numbers of a plurality of image forming apparatuses can be associated with the same license access number "LA05" is because the number of rights allocated to the license access number "LA05" is five if the number of rights is one, the device serial numbers of a plurality of image forming apparatuses cannot be associated with the license access number "LA05."

An application information registration request receiving unit 321 a unit that can be executed in response to an application information registration request received from the network I/F 226 of the license server 101. The application information registration request can be transmitted from the information processing apparatus 121 of the sales company.

There are two patterns with respect to the application information registration request. The first pattern is characterized by including an application file described below in the application information registration request. The second pattern is characterized by including application ID, application version, and application name in the application information registration request. The former is the case where the application is later installed on the image forming apparatus 112. The latter is the case where the application is preinstalled on the image forming apparatus 112.

If the former application information registration request includes an application file 501, the application information registration request receiving unit 321 performs the following processing. The application information registration request receiving unit 321 stores the application file 501 acquired from the received application registration request in the hard disk 224. Then, the application information registration request receiving unit 321 acquires path, application ID, application name, and application version of the stored application file and added the acquired information to the application information table, as a new application information record.

If the latter application information registration request includes application ID, application version, and application name, the application information registration request receiving unit 321 acquires the application ID, the application version, and the application name from the application information registration request and adds the acquired information to application information table, as a new application information record.

A commodity information registration request receiving unit 322 a unit that can be executed in response to a commodity information registration request received from the network I/F 226 of the license server 101. The commodity information registration request can be transmitted from the information processing apparatus 121 of the sales company. The commodity information registration request includes, at least, commodity ID, commodity name, commodity type, number of rights, and application ID. If the commodity type of the commodity information request is "trial", the commodity information registration request additionally includes number of days of use. Further, if the commodity type of the commodity information request is "monthly", the commodity information registration request additionally includes contract period, license suspension date, and contract suspension acceptance date.

The commodity information registration request receiving unit 322 adds data acquired from the received commodity information registration request, as a new commodity information record, to the commodity information table. The license access number issuance request receiving unit 323 is a unit that can be executed in response to a license access number issuance request received from the network I/F 226 of the license server 101. The license access number issuance request can be transmitted from the contract server 122 of the sales company when starting of a contract has been agreed upon between a client and the sales company. The license access number issuance request includes at least commodity ID. When the commodity type of a commodity designated by the license access number issuance request is "monthly", the license access number issuance request includes contract start year/month/day that designates year/month/day from which the license file issued by using the license access number can be used.

The license access number issuance request receiving unit 323 adds data acquired from the received license access number issuance request, as a new license access number information record, to the license access number information table. When the commodity type of a commodity designated by the license access number issuance request is "monthly", the license access number issuance request receiving unit 323 acquires specific commodity information record that coincides with the commodity ID included in the license request from the commodity information table. Then, the license access number issuance request receiving unit 323 acquires stored values from the "contract period" column and the "license suspension date" column of the acquired commodity information record, and calculates the contract end year/month/day based on the contract start year/month/day included in the license access number issuance request. The license access number issuance request receiving unit 323 stores the calculated contract end year/month/day in the "contract end year/month/day" column of the license access number information record.

For example, if a received license access number issuance request includes information about commodity ID "P0003" and contract start year/month/day "Apr. 4, 2015", the contract period of the commodity having the commodity ID "P0003" is one month and the license suspension date is the end of the month. In such a case, the license access number issuance request receiving unit 323 stores end of the month May 31, 2015 in the "contract end year/month/day" column. Further, the license access number issuance request receiving unit 323 stores FALSE in the "contract update" column.

The contract suspension request receiving unit 324 is a unit that can be executed in response to a contract suspension request received from the network I/F 226 of the license server 101. The contract suspension request can be transmitted from the contract server 122 of the sales company when the client cancels the contract of a commodity usable based on monthly payment. The contract suspension request includes a designated license access number of a commodity of which the client wants to suspend the monthly contract. The contract suspension request receiving unit 324 acquires a license access number information record having the license access number acquired from the received contract suspension request from the license access number information table. Then, the contract suspension request receiving unit 324 stores the year/month/day on which the contract suspension request has been received, in the contract suspension acceptance year/month/day of the acquired license access number information record. The contract suspension request receiving unit 324 transmits the value stored in the "contract end year/month/day" column of the acquired license access number information record to the contract server 122 to inform completion of the reception of the contract suspension.

A license acquisition request receiving unit 325 is a unit that can be executed in response to a license acquisition request received from the network I/F 226 of the license server 101. The license acquisition request includes a designated license access number and a designated device serial number. The license acquisition request receiving unit 325 issues a license file having a license type corresponding to the acquired license access number, as will be described in detail with reference to flowcharts illustrated in FIGS. 6A and 6B.

A contract end year/month/day update unit 326 is a unit configured to extend contract expiration timing if the contract suspension request has not been received by the contract suspension request receiving unit 324 of the license server 101 before the contract suspension acceptance date. The contract end year/month/day update unit 326 can be executed periodically (e.g., once a day) by the license server 101, as will be described in detail below with reference to a flowchart illustrated in FIG. 7.

An update license acquisition request receiving unit 327 is a unit that can be executed in response to an update license acquisition request received from the network I/F 226 of the license server 101. The license acquisition request includes a designated device serial number. The update license acquisition request receiving unit 327 issues a license file having an extended contract expiration timing for the acquired device serial number and transmits a response including the issued license file, as described in detail below with reference to a flowchart illustrated in FIG. 8.

An application file acquisition request receiving unit 328 is a unit that can be executed in response to an application file request received from the network I/F 226 of the license server 101. The application file acquisition request includes a designated license access number. The application file acquisition request receiving unit 328 acquires the license access number from the acquired application file acquisition request and acquires specific record that coincides with the acquired license access number from the license access number information record. Next, the application file acquisition request receiving unit 328 acquires the commodity ID from the acquired license access number information record and acquires specific commodity information record that coincides with the acquired commodity ID. Next, the application file acquisition request receiving unit 328 acquires the application ID from the acquired commodity information record. Next, the application file acquisition request receiving unit 328 acquires specific application information record that coincides with the acquired application ID and transmits a response including an application file of a file path included in the acquired application information record if there is a plurality of versions corresponding to the same application ID, there is a plurality of application information records. Therefore, the application file acquisition request receiving unit 328 transmits a response including each version information. If the application file request designates a specific version, the application file acquisition request receiving unit 328 transmits a response including an application file of the designated version. Further, in a case where no file path is present in the application information record, no application file is present. Therefore, the application file acquisition request receiving unit 328 transmits Null.

A license transfer request receiving unit 329 is a unit that can be executed in response to a license transfer request received from the network I/F 226 of the license server 101. The license transfer request includes a transfer license file 521 and a designated device serial number of an image forming apparatus (i.e., a transfer destination).

FIG. 3B illustrates a software configuration 302 of the image forming apparatus 112. To realize each unit of the software configuration 302, the CPU 207 of the image forming apparatus 112 executes a related program loaded from the hard disk 208 of the image forming apparatus 112 into the volatile memory 210. A device information holding unit 341 is a unit configured to hold a device information table in the hard disk 208 of the image forming apparatus 112. The device information table holds device serial number that uniquely identifies the image forming apparatus 112.

A device license information holding unit 342 is a unit configured to hold a device license information table in the nonvolatile memory 209 of the image forming apparatus 112. Table E is an example of the device license information table stored in the device license information holding unit 342.

TABLE E

Device License Information Table

| Application ID | Application Name | Application Version | License Type | Status | Usage Start Date | Usage End Date |
|---|---|---|---|---|---|---|
| app001 | LIPS | 3.0 | Package | Start | | |
| app002 | SEITON FAX | 2.1 | Continuous billing | Start | 2015/2/1 | 2015/5/31 |
| app003 | VNC | 1.3 | Trial | Start | | 2015/5/20 |

Hereinafter, each column of the device license information table will be described in detail below. The "application ID" column is a column that stores information about application ID. The "application name" column is a column that stores information about application name. The "application version" column is a column that stores information about application version. The "license type" column is a column that stores information about license type. The "status" column is a column that stores information about application launching status (e.g., "start" or "suspended"). The "usage start date" column is a column that stores information about year/month/day from which the right to use the application commences. The "usage end date" column is a column that stores information about year/month/day on which the right, to use the application expires. Each record of the device license information table is referred to as "device license information record." The device license information record is added when an application file is installed by using the license file.

A device license history information holding unit. 343 is a unit configured to hold a device license information history table in both the hard disk 208 and the nonvolatile memory 209 of the image forming apparatus 112. The device license history information holding unit 343 can store at a maximum 100,000 histories in the hard disk 208 and 100 histories in the nonvolatile memory 209. Further, in a case where the hard disk 208 has failed and is replaced by a new one, the device license history information holding unit 343 can move the 100 histories stored in the nonvolatile memory 209 to the new hard disk to securely hold the 100 histories data. Table F is an example of the device license information history table stored in the device license history information holding unit 343.

TABLE F

Device License Information History Table

| License ID | Application ID | Unavailable |
|---|---|---|
| LF00001 | app001 | |
| LF00007 | app002 | |
| LF00009 | app003 | |

Hereinafter, each column of the device license information history table will be described in detail below. The "license ID" column is a column that stores information about license ID of a license that is used in installation. The "application ID" column is a column that stores information about application ID of an application that has become usable based on the license ID. The "unavailable" column is a column that stores information indicating unavailability due to issuance of a transfer license or an invalidation license from the device.

An installation screen display request receiving unit 351 is a unit that can be executed by receiving an installation screen display request from the network I/F 205 of the image forming apparatus 112. The installation screen display request can be transmitted from the information processing apparatus 111 of the client. The installation screen display request receiving unit 351 transmits data required to display an installation screen 421 to the information processing apparatus 111 (i.e., the request source).

The installation screen display request receiving unit 351 can be executed in response to the installation screen display request received from the operation unit 212 of the image forming apparatus 112. The installation screen display request receiving unit 351 can transmit the data required to display the installation screen 421 on the display unit 211 of the image forming apparatus 112. An installation request receiving unit 352 is a unit that can be executed in response to an installation request received from the network I/F 205 of the image forming apparatus 112. The installation request can be transmitted when an installation button 423 is pressed on the installation screen 421 of the information processing apparatus 111 of the client. The installation request includes the license access number, which is a value in a license access number text field 412 having been input via the installation screen 421. Processing to be performed by the installation request receiving unit 352 will be described in detail below with reference to flowcharts illustrated in FIGS. 9A and 9B.

A license update detection unit 353 is a unit configured to detect timing at which the image forming apparatus 112 updates the monthly license. The license update detection unit 353 determines that the license update timing has come there is a device license information record whose license type is "monthly" in the device license information table and the usage end date thereof is this month. Further, as another exemplary embodiment, the license update detection unit 353 can detect the license update timing by inquiring the license server 101 about the contract having been updated by the contract end year/month/day update unit 326. An update license acquisition request unit 354 is executed when the license update detection unit 353 detects the license update timing.

The update license acquisition request unit 354 is a unit configured to transmit an update license acquisition request to the license server 101 via the network I/F 205 of the image forming apparatus 112. Processing that can be performed by the update license acquisition request unit 354 will be described in detail below with reference to a flowchart illustrated in FIG. 10.

An application information screen display request receiving unit 355 is a unit that can be executed in response to an application information screen display request received from the network I/F 205 of the image forming apparatus 112. The application information screen display request can be transmitted from the information processing apparatus 111 of the client. The application information screen display request receiving unit 355 transmits data required to display an application information screen 401 described below to the information processing apparatus 111 (i.e., the request source).

To generate the application information screen 401, the application information screen display request receiving unit 355 acquires a device license information record from the device license information table when the application information screen display request has been received. Then, the application information screen display request receiving unit 355 performs setting in such a way as to display labels 402 to 408 based on the acquired device license information record. Further, the application information screen display request receiving unit 355 displays a transfer button 410 if the license type is "package" and displays an invalidation button 411 if the license type is "trial."

A transfer license issuance request receiving unit 356 is a unit that can be executed in response to a transfer license issuance request received from the network I/F 205 of the image forming apparatus 112. The transfer license issuance request can be transmitted from the information processing apparatus 111 of the client when the transfer button 410 of the application information screen 401 is pressed. The transfer license issuance request holds the value of the "application ID" label 402 that corresponds to the record which is pressed using the transfer button 410.

The transfer license issuance request receiving unit 356 sets a value "unavailable" to the "unavailable" column of a device license history information record that coincides with the application ID acquired from the received transfer license issuance request.

Further, the transfer license issuance request receiving unit 356 sets the value "unavailable" to the "status" column of a device license information record that coincides with the acquired application ID. Further, the transfer license issuance request receiving unit 356 issues a transfer license file 521 that includes the acquired application ID and the device serial number stored in the device information table. The issued transfer license file 521 can be acquired by the information processing apparatus 111. Issuing a license file for another image forming apparatus is feasible by transmitting a license transfer request that includes the transfer license file 521 from the information processing apparatus 111 to the license server 101.

An invalidation license issuance request receiving unit 357 is a unit that can be executed in response to an invalidation license issuance request received from the network I/F 205 of the image forming apparatus 112. The invalidation license issuance request can be transmitted from the information processing apparatus 111 of the client when the invalidation button 411 of the application information screen 401 is pressed. The invalidation license issuance request holds the value of the "application ID" label 402 that corresponds to the record pressed using the invalidation button 411.

The invalidation license issuance request receiving unit 357 sets the value "unavailable" to the "unavailable" column of a device license history information record that coincides with the application ID acquired from the received invalidation license issuance request. Further, the invalidation license issuance request receiving unit 357 sets the value "unavailable" to the "status" column of a device license information record that coincides with the acquired application ID.

Further, the invalidation license issuance request receiving unit 357 issues an invalidation license file. The invalidation license file to be issued is a license file 511 that includes the acquired application ID, device serial number stored in the device information table, randomly generated license ID, and number of days left calculated with reference to the usage end date and the present date. Further, the license type of the invalidation license file is "trial." The issued invalidation license file can be acquired by the information processing apparatus 111. In the case of reuse, the number of days left can be employed by transmitting an installation request that includes the invalidation license file from the information processing apparatus 111, to the image forming apparatus 112.

An application usage checking unit 358 is a unit that can control the usage of an application installed on the image forming apparatus 112. The application usage checking unit 358 can be executed in response to an application usage request. The application usage checking unit 358 acquires specific device license information record that coincides with application ID of the application corresponding to the usage request, from the device license information table. Then, if the status is "start" and a condition "usage startable date present date≤usage end date" is satisfied, the application usage checking unit 358 determines that the application is usable.

FIGS. 4A and 4B illustrate exemplary screens that can be provided by the image forming apparatus 112. The application information screen 401 is a screen usable to display installed applications and related license information as well as to transfer and invalidate each license. The application information screen 401 can be transmitted from the image forming apparatus 112 based on an application information screen display request received from a browser of the information processing apparatus 111 so that the application information screen 401 can be displayed on the display unit 211 of the information processing apparatus 111.

The "application ID" label 402 is a label provided to display application ID of each device license information record stored in the device license information table. The "application name" label 403 is a label provided to display application name of each device license information record stored in the device license information table. The "application version" label 404 is a label provided to display application version of each device license information record stored in the device license information table. The "license type" label 405 is a label provided to display license type of each device license information record stored in the device license information table. It is feasible for a user to recognize the type of a license file corresponding to each license by referring to the information of the "license type" label 405. The "status" label 406 is a label provided to display status of each device license information record stored in the device license information table.

The "usage startable date" label 407 is a label provided to display usage startable date of each device license information record stored in the device license information table. The "usage end date" label 408 is a label provided to display usage end date of each device license information record stored in the device license information table. An "operation" field 409 is a field provided to display a button that is operable according to the license type of each device license information record stored in the device license information table.

The transfer button 410 is a button that can be displayed when the license type of a device license information record stored in the device license information table is "package." The screen including the transfer button 410 is referred to as "license transfer screen." The application information screen 401 is the license transfer screen.

The reason why displaying the transfer button 410 is prevented when the license type is "monthly" is because it is intended to have no difference in contract of the device serial number compared to the image forming apparatus currently managed by the contract server 122. The reason why displaying the transfer button 410 is prevented when the license type is "trial" is because the usage period of the trial version can be substantially extended by issuing a new license file for a transfer destination (image forming apparatus). When the transfer button 410 is pressed, the transfer license issuance request is transmitted to the image forming apparatus 112 via the network I/F 205 of the information processing apparatus 111. In this case, the transfer license issuance request includes the value stored in the "application ID" label 402.

The invalidation button 411 is a button that can be displayed when the license type of each device license information record stored in the device license information table is "trial." When the invalidation button 411 is pressed, the invalidation license issuance request is transmitted to the image forming apparatus 112 via the network I/F 205 of the information processing apparatus 111. In this case, the invalidation license issuance request includes the value stored in the "application ID" label 402.

In response to the invalidation license issuance request transmitted by pressing the invalidation button 411, it is feasible to acquire a license file that includes the number of days left (i.e., number of days of use left 518), which can be calculated based on the usage end date of a device license information record that coincides with the transmitted application ID. After issuance of the invalidation license file, the image forming apparatus cannot use the application corresponding to the application included in the transmitted invalidation license issuance request. In the case of reuse, the application becomes available for the number of days left included in the invalidation license file by transmitting the license file acquired as the response to the invalidation license issuance request, to the image forming apparatus.

The invalidation license file is a license file that intends to prevent the number of days of use from decreasing in a period during which the trial of the application is unfeasible. Therefore, it is controlled to perform no display thereof when the license type is "monthly" or "package."

The installation screen 421 is a screen that enables a user to input a license access number to install an intended application. The installation screen 421 can be displayed by the installation screen display request receiving unit 351. The installation screen 421 can be transmitted from the image forming apparatus 112 in response to the installation screen display request received from the browser of the information processing apparatus 111, in such a manner that the installation screen 421 can be displayed on the display unit 211 of the information processing apparatus 111. A license access number input field 422 is a text field in which the application to be installed can be input. The installation button 423 is a button operable to transmit the installation request. When the installation button 423 is pressed, the installation request is transmitted to the image forming apparatus 112 via the network I/F 205 of the information processing apparatus 111. In this case, the installation request includes the value stored in the license access number input field 422.

FIGS. 5A to 5E illustrate data structures of various files. FIG. 5A illustrates a data structure of the application file 501. The application file 501 an expansion program file that is required to install an application that is not present in the image forming apparatus 112 in a factory shipping state. The application file 501 is data that holds information about at least the following items 502 to 505. The item "application ID" 502 is an identifier that can uniquely identify each application. The item "application name" 503 is name of each application. The item "application version" 504 is version of each application. The item "execution file" 505 is a program that can run on the image forming apparatus 112.

FIG. 5B illustrates an example of a license file (monthly) 511 to be issued when the commodity type is "monthly." The license file (monthly) 511 is a file required when the image forming apparatus 112 uses the application file 501. The license file (monthly) 511 is data that holds information about at least the following items 512 to 517 when the license file is issued for the license access number of a commodity whose type is "monthly."

The item "license ID" 512 is data that stores license ID that can uniquely identify each license file. The item "license type" 513 is data that stores the license type of each license file. The information "monthly" is stored in the item "license type" 513 if the license file is issued for the license access number of a commodity whose type is "monthly." The item "application ID" 514 is data that stores application ID of each application file that can be installed based on the present license file. The item "device serial number" 515 is data that stores device serial number of the image forming apparatus 112 that can be installed based on the present license file. The item "usage start year/month/day" 516 is data that stores year/month/day from which the usage of the application file based on the present license file can be started. The item "usage end year/month/day" 517 is data that stores information about year/month/day on which the usage of the application file based on the present license file ends.

FIG. 5C illustrates an example of a license file (trial) 511 to be issued when the commodity type is "trial." The license file (trial) 511 is data that holds information about at least the items 512 to 515 and 518 when the license file is issued for the license access number of a commodity whole commodity type is "trial." The information "trial" is stored in the item "license type" 513 if the license file is issued for the license access number of a commodity whose type is "trial." The item "number of days of use left" 518 is data that stores number of days left during which the application file can be used based on the present license file.

FIG. 5D illustrates an example of a license file (package) 511 to be issued when the commodity type is "package." The license file (package) 511 is data that holds information about at least the items 512 to 515 when the license file is issued for the license access number of a commodity whose is "package." The information "package" is stored in the license type 513 if the license file is issued for a license access number of a commodity whose type is "package."

FIG. 5E illustrates an example of a license file (the transfer license file 521) to be generated when the image forming apparatus 112 executes the transfer license issuance request receiving unit 356. The transfer license file 521 is necessary when the image forming apparatus 112 suspends the usage of the application file 501 and should be returned to the license server 101 so that the file can be used by another image forming apparatus. The transfer license file 521 is data that holds information about at least the following items 522 and 523. The item "application ID" 522 is data that stores application ID of an application whose usage has been suspended. The item "transfer source device serial number" 523 is data that stores device serial number of the image forming apparatus 112 in which the usage of the application has been suspended.

Figure 6A:
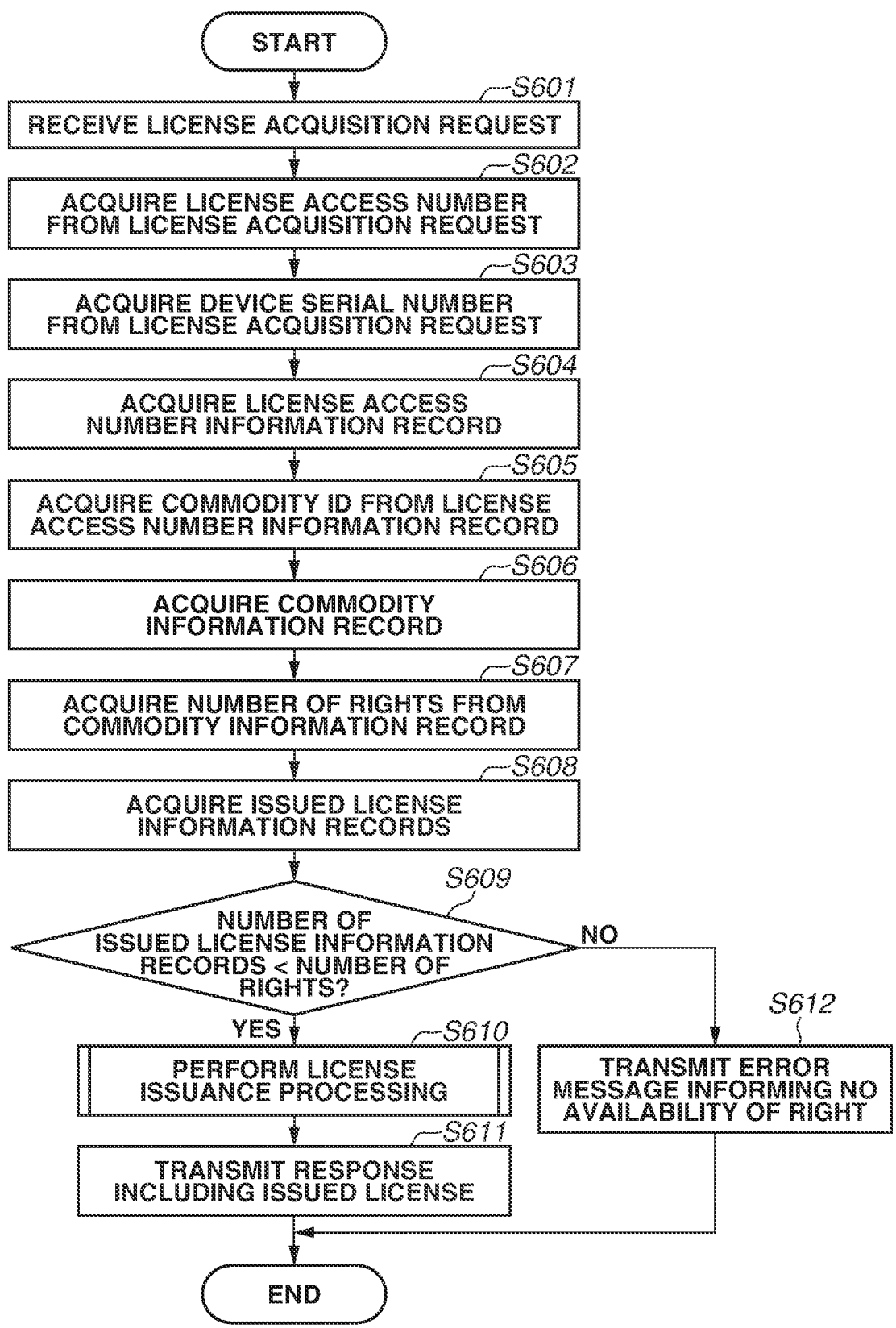
FIGS. 6A and 6B are flowcharts illustrating processing that can be performed by a license acquisition request receiving unit.

Hereinafter, the first exemplary embodiment of the present invention will be described in detail with reference to the flowcharts illustrated in FIGS. 6A and 6B. FIG. 6A is a flowchart illustrating processing that can be performed by the license acquisition request receiving unit 325 of the license server 101 in response to the license acquisition request received via the network I/F 226. The license acquisition request can be transmitted from the image forming apparatus 112 when the installation button 423 is pressed on the installation screen 421.

In step S601, the license acquisition request receiving unit 325 receives the license acquisition request. In step S602, the license acquisition request receiving unit 325 acquires the license access number from the license acquisition request received in step S601. In step S603, the license acquisition request receiving unit 325 acquires the device serial number from the license acquisition request received in step S601. In step S604, the license acquisition request receiving unit 325 acquires specific license access number information record having a value stored in the "license access number" column that coincides with the license access number acquired in step S602 from the license access number information table. In step S605, the license acquisition request receiving unit 325 acquires the commodity ID from the license access number information record acquired in step S604. In step S606, the license acquisition request receiving unit 325 acquires specific commodity information record having a value stored in the "commodity ID" column that coincides with the commodity ID acquired in step S605 from the commodity information table.

In step S607, the license acquisition request receiving unit 325 acquires the number of rights from the commodity information record acquired in step S606. In step S608, the license acquisition request receiving unit 325 acquires a list of license information records each having a value stored in the "license access number" column that coincides with the license access number acquired in step S602, as a list of issued license information records. In step S609, the license acquisition request receiving unit 325 checks if the number of issued license information records in the list acquired in step S608 is smaller than the number of rights acquired in step S607. If it is determined that the number of issued license information records is less than the number of rights (Yes in step S609), the operation proceeds to step S610 to perform license issuance processing because a new license issuable. If the number of issued license information records is not less than the number of rights (No in step S609), the operation proceeds to step S612 because no license is newly issuable. In step S610, the license acquisition request receiving unit 325 performs the license issuance processing, which will be described in detail below with reference to FIG. 6B. In step S611, the license acquisition request receiving unit 325 transmits the license issued in step S610 as a response relying to the license acquisition request received in step S601 and then terminates the processing of the flowchart illustrated in FIG. 6A. In step S612, the license acquisition request receiving unit 325 transmits an error message informing that no available right remains as a response that replies to the license acquisition request received in step S601 and then terminates the processing of the flowchart illustrated in FIG. 6A.

Figure 6B:
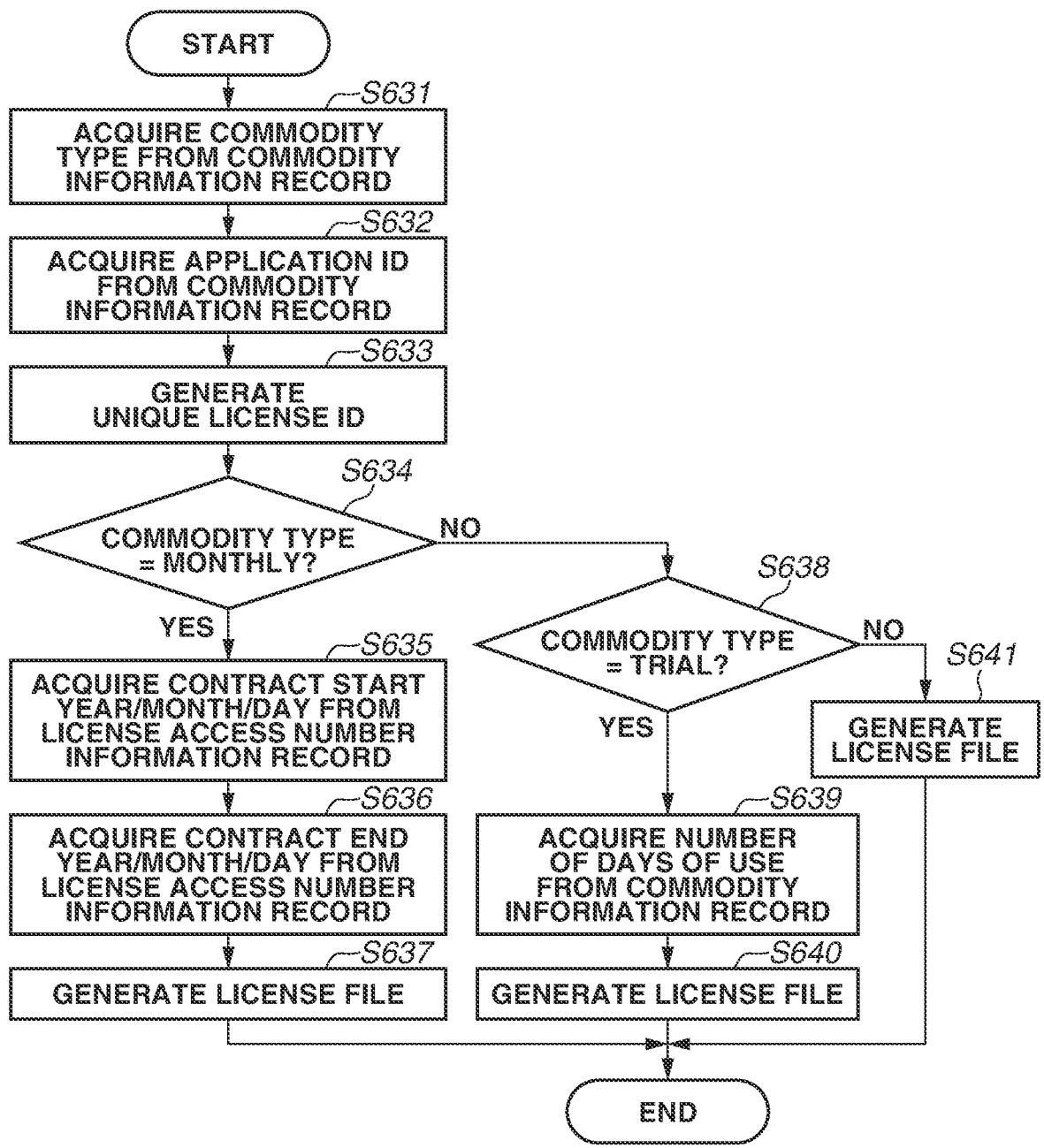

FIG. 6B is a flowchart illustrating details of the processing to be performed by the license acquisition request receiving unit 325 in step S610. In step S631, the license acquisition request receiving unit 325 acquires the commodity type from the commodity information record acquired in step S606. In step S632, the license acquisition request receiving unit 325 acquires the application ID from the commodity information record acquired in step S606. In step S633, the license acquisition request receiving unit 325 generates unique license ID. In step S634, the license acquisition request receiving unit 325 checks if the commodity type acquired in step S631 is "monthly." If the commodity type is "monthly" (Yes in step S634), the operation proceeds to step S635. If the commodity type is not "monthly" No in step S634), the operation proceeds to step S638. In step S635, the license acquisition request receiving unit 325 acquires the contract start year/month/day from the license access number information record acquired in step S604 in step S636, the license acquisition request receiving unit 325 acquires the contract end year/month/day from the license access number information record acquired in step S604.

In step S637, the license acquisition request receiving unit 325 generates a license file 511. The license file 511 generated in this case includes the license ID generated in step S633, the device serial number acquired in step S603, the application ID acquired in step S632, and the commodity type information "monthly." Further, because the license file type is "monthly", the issued license file additionally includes the contract start year/month/day acquired in step S635 and the contract end year/month/day acquired in step S636. Subsequently, the operation proceeds to step S611. In step S638, the license acquisition request receiving unit 325 checks if the commodity type acquired in step S631 is "trial" if the commodity type is "trial" (Yes in step S638), the operation proceeds to step S639. If the commodity type is not "trial" No in step S638), the operation proceeds to step S641. In step S639, the license acquisition request receiving unit 325 acquires the number of days of use from the commodity information record acquired in step S606.

In step S640, the license acquisition request receiving unit 325 generates a license file 511. The license file 511 generated in this case includes the license ID generated in step S633, the device serial number acquired in step S603, the application ID acquired in step S632, and the commodity type information "trial." Further, because the license file type is "trial", the issued license file additionally includes the number of days of use acquired in step S639. Then, the operation proceeds to step S611. In step S641, the license acquisition request receiving unit 325 generates a license file 511. The license file 511 generated in this case includes the license ID generated in step S633, the device serial number acquired in step S603, the application ID acquired in step S632, and the commodity type information "package." Then, the operation proceeds to step S611.

Through the above-mentioned processing of the flowcharts illustrated in FIGS. 6A and 6B, each license file 511 required to install the application file 501 initially on the image forming apparatus 112 can be issued according to the commodity type.

Figure 7:
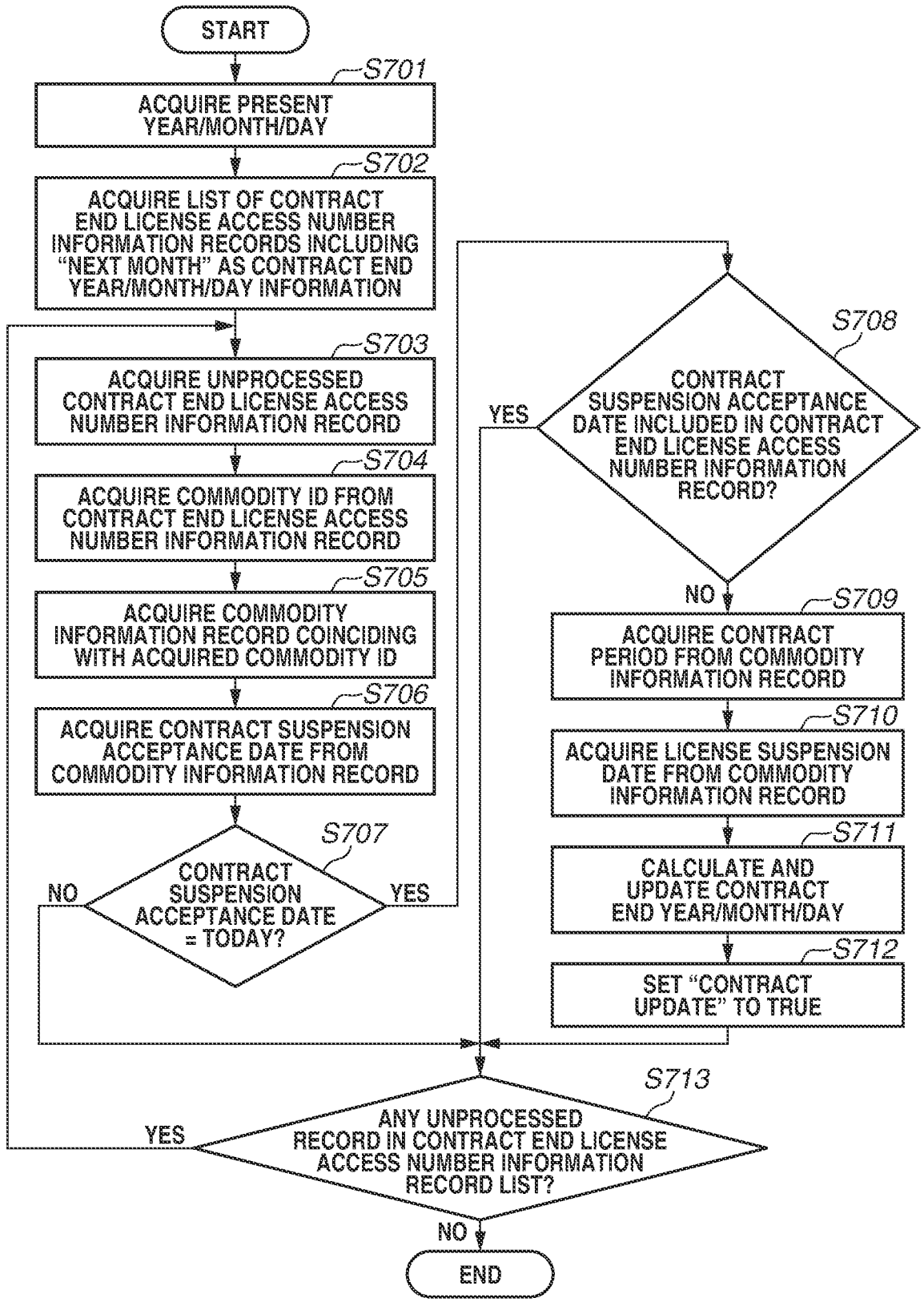
FIG. 7 is a flowchart illustrating processing that can be performed by a contract end year/month/day update unit.

FIG. 7 is the flowchart illustrating processing that can be performed daily by the contract end year/month/day update unit 326 of the license server 101. In step S701, the contract end year/month/day update unit 326 acquires the present year/month/day from a clock provided in the image forming apparatus 112. In step S702, the contract end year/month/ day update unit 326 acquires each license access number information record having the contract end year/month/day that indicates the contract expires the next month, as a contract end license access number information record list. In step S703, the contract end year/month/day update unit 326 acquires an unprocessed record from the contract end license access number information record list acquired in step S702. In step S704, the contract end year/month/day update unit 326 acquires the commodity ID from the contract end license access number information record acquired in step S703. In step S705, the contract end year/month/day update unit 326 acquires a commodity information record having a value stored in the "commodity ID" column, which coincides with the commodity ID acquired in step S704, from the commodity information table.

In step S706, the contract end year/month/day update unit 326 acquires the contract suspension acceptance date from the commodity information record acquired in step S705. In step S707, the contract end year/month/day update unit 326 checks if the contract suspension acceptance date acquired in step S706 is today with reference to the year/month/day acquired in step S701 if the contract suspension acceptance date is today (Yes in step S707), the operation proceeds to step S708. If the contract suspension acceptance date is not today (No in step S707), the operation proceeds to step S713. In step S708, the contract end year/month/day update unit 326 checks if the contract suspension acceptance date is present in the contract end license access number information record acquired in step S703. If there is a value in the "contract suspension acceptance date" column, it means that the contract suspension request receiving unit 324 has received the contract suspension request from the contract server 122. If the "contract suspension acceptance date" column stores a value (Yes in step S708), the contract end year/month/day update unit 326 determines that the contract is currently suspended and does not update the contract end year/month/day. Then, the operation proceeds to step S713. If the "contract suspension acceptance date" column does not store any value (No in step S708), the operation proceeds to step S709 to updates the contract end year/month/day in such a way as to automatically extend the contract expiration timing.

In step S709, the contract end year/month/day update unit 326 acquires the contract period acquired in step S705. In step S710, the contract end year/month/day update unit 326 acquires the license suspension date from the commodity information record acquired in step S705. In step S711, the contract end year/month/day update unit 326 calculates value to update the contract end year/month/day of the contract end license access number information record acquired in step S703 based on the contract period and the license suspension date acquired in steps S709 and S710. For example, if the contract end year/month/day is "2015/ 5/31", the contract period is "one month", and the license suspension date is "end of the month", a calculated value "2015/6/30" (i.e., the end of the next month) can be obtained by the contract end year/month/day update unit 326. The value stored in the "contract end year/month/day" column of the contract end license access number information record acquired in step S703 can be overwritten (updated) with the calculated value.

In step S712, the contract end year/month/day update unit 326 stores TRUE as a value in the "contract update" column of the contract end license access number information record acquired in step S703. The value stored in the "contract update" column can be used to determine whether to issue an update license in response to the update license acquisition request received from the image forming apparatus 112. After the value TRUE is set in the "contract update" column in step S712, the update license can be issued when the update license acquisition request is received. In step S713, the contract end year/month/day update unit 326 checks if there is any unprocessed record in the contract end license access number information record list. If there is an unprocessed record (Yes in step S713), the operation returns to step S703. If there is not any unprocessed record (No in step S713), the contract end year/month/day update unit 326 terminates the processing of the flowchart illustrated in FIG. 7.

In a case where there is a license that expires the next month, it is feasible to update the contract period of the license if the contract is not suspended even when the contract suspension acceptance date has passed, through the above-mentioned processing of the flowchart illustrated in FIG. 7.

Figure 8:
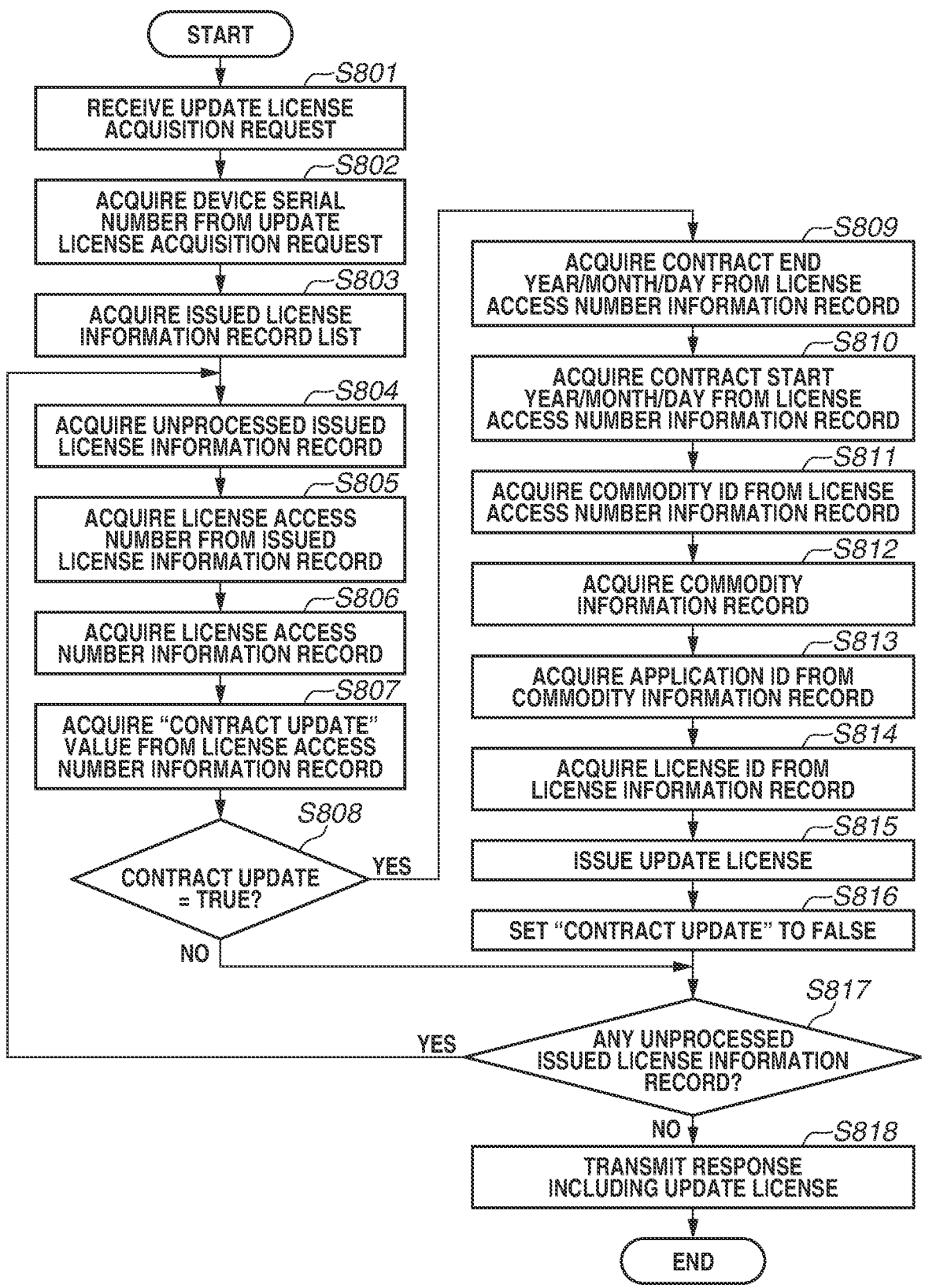
FIG. 8 is a flowchart illustrating processing that can be performed by an update license acquisition request receiving unit.

FIG. 8 is the flowchart illustrating processing that can be performed by the update license acquisition request receiving unit 327 of the license server 101 in response to the update license acquisition request received via the network I/F 226. The update license acquisition request can be transmitted from the update license acquisition request unit 354 of the image forming apparatus 112. The update license acquisition request receiving unit 327 performs processing for issuing a monthly-type license file having an updated contract for the device serial number included in the update license acquisition request and transmitting a response including the issued license file.

In step S801, the update license acquisition request receiving unit 327 receives the update license acquisition request. In step S802, the update license acquisition request receiving unit 327 acquires the device serial number from the update license acquisition request received in step S801. In step S803, the update license acquisition request receiving unit 327 acquires each license information record that coincides with the device serial number acquired in step S802, as a list of issued license information records, from the license information table. In step S804, the update license acquisition request receiving unit 327 acquires an unprocessed record from the list of issued license information records acquired in step S803. In step S805, the update license acquisition request receiving unit 327 acquires the license access number from the issued license information record acquired in step S804.

In step S806, the update license acquisition request receiving unit 327 acquires specific license access number information record that coincides with the license access number acquired in step S805 from the license access number information table. In step S807, the update license acquisition request receiving unit 327 acquires the value stored in the "contract update" column from the license access number information record acquired in step S806. In step S808, the update license acquisition request receiving unit 327 checks if the contract update value acquired in step S807 is TRUE. If the contract update value is TRUE (Yes in step S808), the operation proceeds to step S809. If the contract update value is not TRUE (No in step S808), the operation proceeds to step S817. In step S809, the update license acquisition request receiving unit 327 acquires the contract end year/month/day from the license access number information record acquired in step S806. In step S810, the update license acquisition request receiving unit 327 acquires the contract start year/month/day from the license access number information record acquired in step S806.

In step S811, the update license acquisition request receiving unit 327 acquires the commodity ID from the license access number information record acquired in step S806. In step S812, the update license acquisition request receiving unit 327 acquires specific commodity information record that coincides with the commodity ID acquired in step S811 from the commodity information table. In step S813, the update license acquisition request receiving unit 327 acquires the application ID from the commodity information record acquired in step S812. In step S814, the update license acquisition request receiving unit 327 acquires the license ID from the license information record acquired in step S804. The license ID acquired in this case is the license ID of a license file having been previously issued. In step S815, the update license acquisition request receiving unit 327 issues a "license file for update" 511. The information "monthly" is set as the license type 513 of the "license file for update" 511. Further, the device serial number acquired in step S802, the contract end year/month/day acquired in step S809, the contract start year/month/day acquired in step S810, and the application ID acquired in step S813 are used to set the "license file for update" 511. Further, the license file ID acquired in step S814 is set as the license ID 512 of the "license file for update" 511.

In step S816, the update license acquisition request receiving unit 327 sets FALSE as a value in the "contract update" column of the license access number information record acquired in step S806. In step S817, the update license acquisition request receiving unit 327 checks if an unprocessed record is present in the list of issued license information records acquired in step S803. If there is an unprocessed record (Yes in step S817), the operation returns to step S804. If there is not any unprocessed record (No in step S817), the operation proceeds to step S818. In step S818, the update license acquisition request receiving unit 327 transmits a response including the "license file for update" issued in step S815 and terminates the processing of the flowchart illustrated in FIG. 8.

Through the above-mentioned processing of the flowchart illustrated in FIG. 8, it is feasible to transmit a response including an updated license file having an extended contract period for the device serial number included in the received update license acquisition request. The license file issued in this case can be a license that holds the previously issued license file ID.

FIG. 9A is a flowchart illustrating processing that can be performed by the installation request receiving unit 352 of the image forming apparatus 112 in response to an installation request received via the network I/F 205. In step S901, the installation request receiving unit 352 receives the installation request in step S902, the installation request receiving unit 352 acquires the license access number from the received installation request. In step S903, the installation request receiving unit 352 acquires the device serial number from the device information table in step S904, the installation request receiving unit 352 transmits an application file acquisition request to the license server 101. The application file acquisition request transmitted in this case includes the license access number acquired in step S902. The installation request receiving unit 352 acquires an application file as a response that replies to the transmitted application file acquisition request. If there is a plurality of versions, the received response includes information about the plurality of versions. Therefore, the installation request receiving unit 352 selects a version and acquires an intended application file by transmitting the application file acquisition request again. Further, in a case where no application file is present, the installation request receiving unit 352 transmits Null.

In step S905, the installation request receiving unit 352 transmits a license acquisition request to the license server 101. The license acquisition request transmitted in this case includes the license access number acquired in step S902 and the device serial number acquired in step S903. The installation request receiving unit 352 acquires a license file as a response that replies to the transmitted license acquisition request. In step S906, the installation request receiving unit 352 performs installation processing based on the application file acquired in step S904 and the license file acquired in step S905. The installation processing will be described in detail below with reference to the flowchart illustrated in FIG. 9B.

FIG. 9B is a flowchart illustrating details of the installation processing to be performed in step S906. In step S921, the installation request receiving unit 352 acquires the license ID from the license file acquired in step S905. In step S922, the installation request receiving unit 352 acquires the application ID from the license file acquired in step S905. In step S923, the installation request receiving unit 352 acquires the license type from the license file acquired in step S905. In step S924, the installation request receiving unit 352 checks if the application file has been successfully acquired in step S904 if the application file has been successfully acquired (Yes in step S924), the operation proceeds to S925. If the acquisition fails due to Null No in step S924), the operation proceeds to step S927. In step S925, the installation request receiving unit 352 acquires the application ID from the application file acquired in step S904.

In step S926, the installation request receiving unit 352 checks if the application ID acquired in step S925 coincides with the application ID acquired in step S922. If the compared application IDs coincide with each other (Yes in step S926), the operation proceeds to step S929. If the compared application IDs do not coincide with each other (No in step S926), the operation proceeds to step S928. In step S927, the installation request receiving unit 352 checks if an application file that coincides with the application ID acquired in step S922 is present in the hard disk 208 of the image forming apparatus 112. If the application file is present, more specifically, if the installation request receiving unit 352 confirms that the same license ID is already present in the device license information history table (Yes in step S927), the operation proceeds to step S929. If the same license ID is not present (No in step S927), the operation proceeds to step S928. In step S928, the installation request receiving unit 352 displays an error message informing that there is not any application file that can be used based on the license file and terminates the processing of the flowchart illustrated in FIG. 9B.

In step S929, the installation request receiving unit 352 checks if the license ID acquired in step S921 is present as a value stored in the "license ID" column of the device license information history table. If the device license information history table includes the checked license ID (Yes in step S929), the operation proceeds to step S931. If the checked license ID is not present (No in step S929), the operation proceeds to step S930. In step the installation request receiving unit 352 newly generates a device license history information record that includes the license ID acquired in step S921 as a value stored in the "license ID" column and adds the generated device license history information record to the device license information history table. In step S931, the installation request receiving unit 352 checks if the license type acquired in step S923 is "monthly." If the license type is "monthly" (Yes in step S931), the operation proceeds to step S933. If the license type is not "monthly" (No in step S931), the operation proceeds to step S932. In step S932, the installation request receiving unit 352 displays an error message informing that license file is already used and terminates the processing of the flowchart illustrated in FIG. 9B. In step S933, the installation request receiving unit 352 checks if a device license information record having a value of the "application ID" column that coincides with the application ID acquired in step S922 is present. If the checked device license information record is present (Yes in step S933), the operation proceeds to step S935. If the checked device license information record is not present (No in step S933), the operation proceeds to step S934.

In step S934, the installation request receiving unit 352 newly generates a device license information record and adds the generated record to the device license information table. If the license type acquired in step 3923 is "monthly", the device license information record includes information about the items "license type" 513, "usage start year/month/day" 516, and "usage end year/month/day" 517 included in the license file 511 if the license type acquired in step S923 is "trial", the device license information record includes information about the item "license type" 513 and year/month/day obtained by adding the "number of days of use left" 518 included in the license file 511 to the present year/month/day. If the license type acquired in step S923 is "package", the device license information record includes information about the item "license type" 513 included in the license file 511. The device license information record further includes information about the items "application ID" 502, "application name" 503, and "application version" 504 included in the application file 501. Further, the installation request receiving unit 352 sets "start" as the value stored in the "status" column of the device license information record.

In step S935, the installation request receiving unit 352 updates the device license information record acquired in step S933. If the license type acquired in step S923 is "monthly", the installation request receiving unit 352 updates device license information record in such a way as to overwrite the value stored in the "usage suspension" column with the value of the item "usage end year/month/day" 517 included in the license file 511. If the license type acquired in step S923 is "trial", the installation request receiving unit 352 updates device license information record in such a way as to add the value of the item "number of days of use left" 516 included in the license file 511 to the value stored in the "usage suspension" column. In the present exemplary embodiment, if the license type is "monthly", the value stored in the "usage suspension" column is overwritten with the value of the item "usage end year/month/day" 517 included in the license file. However, if the value of the item "usage end year/month/day" 517 is older than the usage end date of the device license information record, the installation request receiving unit 352 can cancel the update of the device license information record. In step S936, the installation request receiving unit 352 validates the application file acquired in step S904 or S927.

Through the above-mentioned processing of the flowchart illustrated in FIGS. 9A and 9F, it is feasible to install an application in response to a received installation request. In this case, if the license ID of the acquired license file is already used, it is feasible to update the expiration timing when it is confirmed that the license type is "monthly" and interrupt the processing (as error processing) when it is confirmed that the license is other than "monthly." Performing the above-mentioned processing can prevent, unlawful use (e.g., the act of extending the expiration date by using the previously used license file).

Figure 10:
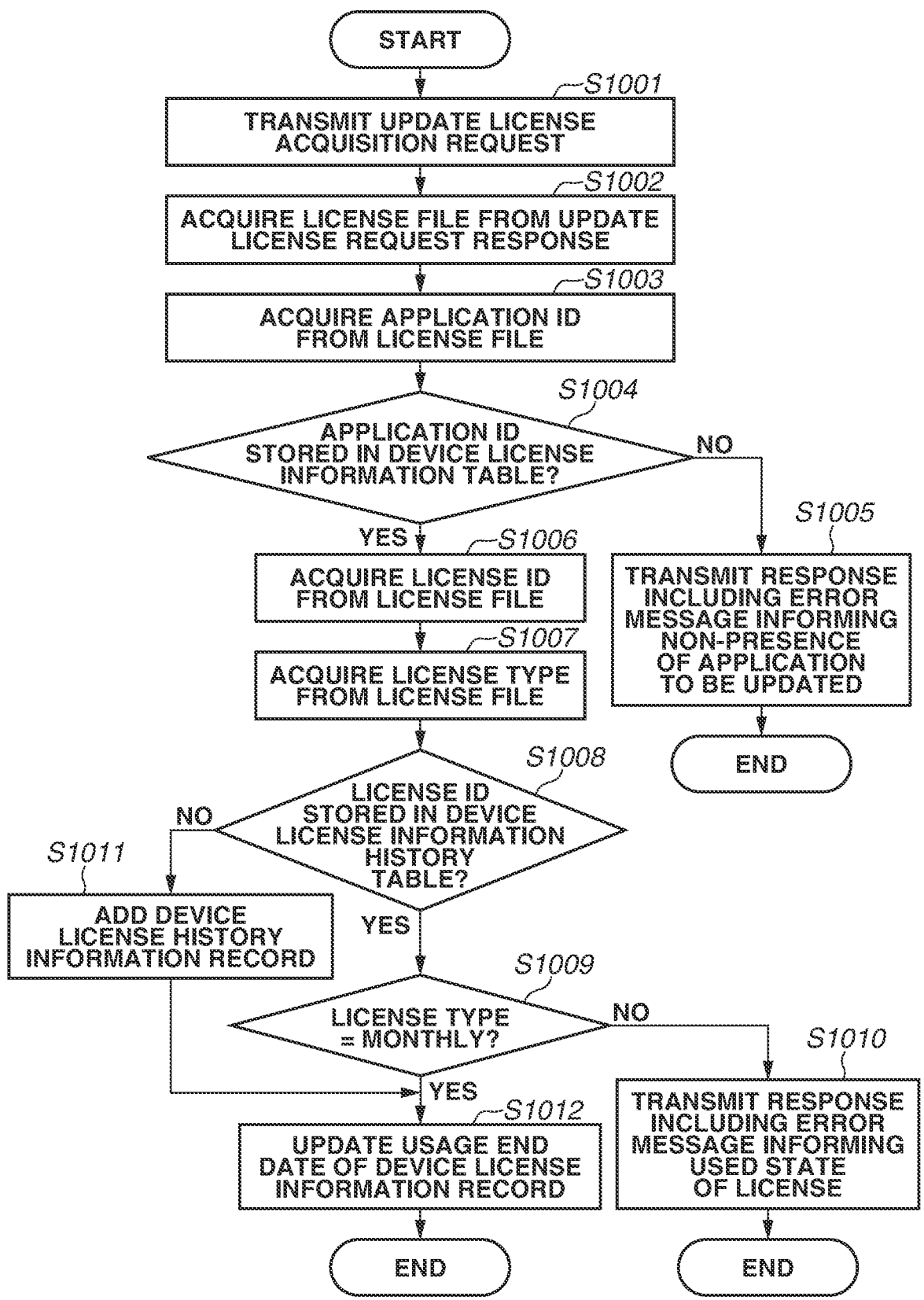
FIG. 10 is a flowchart illustrating processing that can be performed by an update license acquisition request unit.

FIG. 10 is a flowchart illustrating processing that can be performed by the update license acquisition request unit 354, which can be launched by the license update detection unit 353 of the image forming apparatus 112. In step S1001, the update license acquisition request unit 354 transmits an update license acquisition request to the license server 101. The update license acquisition request includes the device serial number acquired from the device information table. In step S1002, the update license acquisition request unit 354 receives a license file as a response that replies to the update license request transmitted in step S1001.

In step S1003, the update license acquisition request unit 354 acquires the application ID from the license file received in step S1002. In step S1004, the update license acquisition request unit 354 checks if a record having a value of the "application ID" column that coincides with the application ID acquired in step S1003 is present in the license information table. If the license information table includes the checked record (Yes in step S1004), the operation proceeds to step S1006. If the checked record is not present (No in step S1004), the operation proceeds to step S1005.

In step S1005, the update license acquisition request unit 354 transmits a response including an error message informing that there is not any application to be updated. In step S1006, the update license acquisition request unit 354 acquires the license ID from the license file acquired in step S1002 in step S1007, the update license acquisition request unit 354 acquires the license type from the license file acquired in step S1002. In step S1008, the update license acquisition request unit 354 checks if a record having a value stored in the "license ID" column that coincides with the license ID acquired in step S1006 is present in the device license information history table. If the device license information history table includes the checked record (Yes in step S1008), the operation proceeds to step S1009. If the checked record is not present (No in step S1008), the operation proceeds to step S1011. In step S1009, the update license acquisition request unit 354 checks if the license type acquired in step S1007 is "monthly." If the license type is "monthly" (Yes in step S1009), the operation proceeds to step S1012. If the license type is not "monthly" (No in step S1009), the operation proceeds to step S1010. In step S1010, the update license acquisition request unit 354 transmits a response including an error message informing that the license is already used.

In step S1011, the update license acquisition request unit 354 newly generates a device license history information record that holds the license ID acquired in step S1006 and adds the generated device license history information record to the device license information history table. In step S1012, the update license acquisition request unit 354 updates the usage end date of the device license information record acquired in step S1004. When the license type acquired in step S1007 is "monthly", the update license acquisition request unit 354 overwrites the usage end date with the value of the usage end year/month/day 517 of the license file acquired in step S1002. If the license type acquired in step S1007 is "trial", the update license acquisition request unit 354 adds the "number of days of use left" value of the license file acquired in step S1002. In the present exemplary embodiment, if the license type is "monthly", the overwriting is performed with the value of the usage end year/month/day 517 included in the license file. However, if the value of the item "usage end year/month/day" 517 is older than the usage end date of the device license information record, the update license acquisition request unit 354 can cancel the update of the device license information record.

Through the above-mentioned processing of the flowchart illustrated in FIG. 10, if the license ID of the acquired license file is already used, it is feasible to update the expiration timing when the license type is "monthly" and in the processing (as error processing) when the license type is other than monthly. Performing the interrupt or error) processing can prevent unlawful use (e.g., the act of extending the expiration date by using the previously used license file). On the other hand, when a commodity is based on monthly billing, coincidence in license ID is not regarded as an error and it is feasible to update the license period so that an information processing apparatus can hold more license histories.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (RPM), a storage of distributed computing systems, an optical disk (such as a compact disc (CD), digital versatile disc (DVD), or Blu-ray Disc (BD)™), a flash memory device, a memory card, and the like.

According to the present invention, an information processing apparatus equipped with a memory having a limited storage capacity can hold more license histories because the information processing apparatus is installed with a license that does not update identification information while updating the valid period of the license.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-128691, filed Jun. 26, 2015, which is hereby incorporated by reference herein in its entirety.

What is claimed is:

1. An information processing apparatus that controls an operation of an application based on a license file, comprising:
　　at least one memory having instructions stored therein;
　　at least one processor that, upon execution of the instructions, is configured to:
　　store in memory, a history table including license identification information that uniquely identifies an installed license file,
　　receive, a license file including license identification information that uniquely identifies the received license file and information identifying a type of license, the received license file instructing the information processing apparatus to perform an installation process for installing the received license file on the information processing apparatus,
　　based on a determination that the license identification information of the received license file is present in the history table and that the type of license associated with the received license file is a type of license based on charging per certain period of time, cause the received license file to be installed even if the license identification information that uniquely identifies the received license file is present in the history table; and display, on a display device, a license transfer screen that prevents a user from instructing transferring a specific type license file to another information processing apparatus and enables the user to instruct transferring a license file other than the specific type license file to another information processing apparatus, wherein if a license file is other than the specific type license file and a usage suspension date thereof is determined beforehand, the display device displays a license transfer screen that enables the user to instruct invalidating the license file instead of transferring the license file.

2. The information processing apparatus according to claim 1, wherein the license transfer screen displayed by the display can recognize the type of each license file.

3. The information processing apparatus according to claim 1, wherein the specific type license file is issued in an event of update of license based on a license update contract with a client, and is issued in such a manner that license identification information to be allocated based on the update of license becomes identical to license identification information allocated to a previously issued license file.

4. The information processing apparatus according to claim 1, wherein issuance of the specific type license file is requested if it is determined that updating the license file is necessary based on suspension date included in the specific type license file or inquiry to a license server that issues the license file.

5. The information processing apparatus according to claim 1, wherein the license file other than the specific type license file is a license file to be issued in such a manner that license identification information is allocated uniquely each time the license file is issued.

6. The information processing apparatus according to claim 1, wherein execution of the instructions further configures the at least one processor to, when the installation of the license file is instructed, the cause an error message to be displayed indicating that the license file is already used if the license identification information that uniquely identifies the installation instructed license file is included in the history table.

7. The information processing apparatus according to claim 1, wherein the license file includes at least two of the license identification information and application ID.

8. A method of controlling an information processing apparatus that controls an operation of an application based on a license file, the method comprising:

storing, in memory, a history table including license identification information that uniquely identifies an installed license file;

receiving an instruction to install a received license file including license identification information that uniquely identifies the received license file and information identifying a type of license;

determining whether the license identification information of the received license file is present in the history table and that the type of license associated with the received license file is a type of license based on charging per certain period of time;

causing the received license file to be installed even if the license identification information that uniquely identifies the received license file is present in the history table; and displaying, on a display device, a license transfer screen that prevents a user from instructing transferring a specific type license file to another information processing apparatus and enables the user to instruct transferring a license file other than the specific type license file to another information processing apparatus, wherein if a license file is other than the specific type license file and a usage suspension date thereof is determined beforehand, the display device displays a license transfer screen that enables the user to instruct invalidating the license file instead of transferring the license file.

9. A non-transitory computer-readable storage medium storing instructions that, when executed by a processor controls an information processing apparatus to execute a method that can control an operation of an application based on a license file, the method comprising:

storing, in memory, a history table including license identification information that uniquely identifies an installed license file;

receiving an instruction to install a received license file including license identification information that uniquely identifies the received license file and information identifying a type of license;

determining whether the license identification information of the received license file is present in the history table and that the type of license associated with the received license file is a type of license based on charging per certain period of time;

causing the received license file to be installed even if the license identification information that uniquely identifies the received license file is present in the history table; and displaying, on a display device, a license transfer screen that prevents a user from instructing transferring a specific type license file to another information processing apparatus and enables the user to instruct transferring a license file other than the specific type license file to another information processing apparatus, wherein if a license file is other than the specific type license file and a usage suspension date thereof is determined beforehand, the display device displays a license transfer screen that enables the user to instruct invalidating the license file instead of transferring the license file.

* * * * *